United States Patent [19]

Millet et al.

[11] Patent Number: 4,847,509
[45] Date of Patent: Jul. 11, 1989

[54] METHOD AND APPARATUS FOR MEASURING THE DIAMETER OF A RUNNING ELONGATE OBJECT SUCH AS AN OPTICAL FIBER

[75] Inventors: Jocelyn Millet, Pertuis; Jean Debrie, Aix en Provence, both of France

[73] Assignee: Bertin & Cie, Plaisir Cedex, France

[21] Appl. No.: 127,893

[22] PCT Filed: Mar. 13, 1987

[86] PCT No.: PCT/FR87/00075
§ 371 Date: Nov. 12, 1987
§ 102(e) Date: Nov. 12, 1987

[87] PCT Pub. No.: WO87/05690
PCT Pub. Date: Sep. 24, 1987

[30] Foreign Application Priority Data

Mar. 14, 1986 [FR] France ............... 86 03700

[51] Int. Cl.⁴ .................. G01N 21/86; G01B 11/10
[52] U.S. Cl. ............................ 250/560; 356/386
[58] Field of Search .......... 356/73.1, 384–387; 250/560, 561, 227; 358/107

[56] References Cited

U.S. PATENT DOCUMENTS

| | | | |
|---|---|---|---|
| 3,761,182 | 9/1973 | Kubisiak et al. | 356/387 |
| 3,787,700 | 1/1974 | Chasson | 250/560 |
| 3,806,253 | 4/1974 | Denton | 356/386 |
| 4,152,767 | 5/1979 | Laliotis | 250/560 |
| 4,341,472 | 7/1982 | Gorog et al. | 250/561 |
| 4,499,383 | 2/1985 | Loose | 356/384 |
| 4,576,482 | 3/1986 | Pryor | 356/384 |
| 4,636,969 | 1/1987 | Kyoden et al. | 250/560 |
| 4,645,347 | 2/1987 | Rioux | 356/376 |

FOREIGN PATENT DOCUMENTS 0157431 10/1985 European Pat. Off. .

OTHER PUBLICATIONS

Baier, et al. "Line Width Measurement in Grey Level Digitized Patterns" IBM Tech. Dis. Bulletin, vol. 25, No. 5, 10/82, pp. 2349–2350.

Primary Examiner—David C. Nelms
Assistant Examiner—Michael Messinger
Attorney, Agent, or Firm—Dennison, Meserole, Pollack & Scheiner

[57] ABSTRACT

The diameter of a running elongate object such as an optical fiber is measured by means of two opto-electronic systems. The systems have optical axes which are perpendicular to each other and to the running axis of the object. Each of the systems further includes a microscope lens for forming a blurred image of the object on a strip of photodetectors. The systems combine their images in an apparatus which calculates an accurate position of each edge of the object by interpolation.

7 Claims, 2 Drawing Sheets

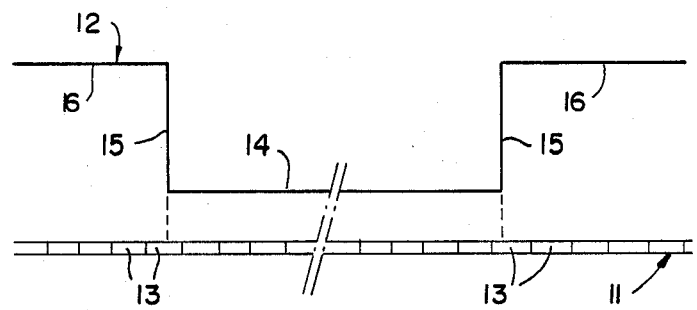
FIG. 2
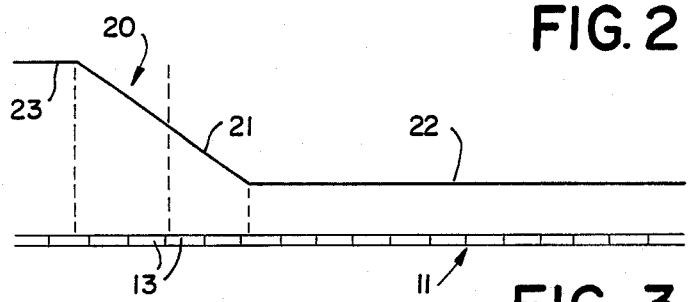
FIG. 3
FIG. 4
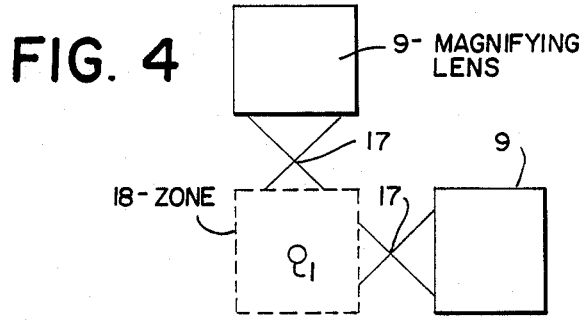
FIG. 5
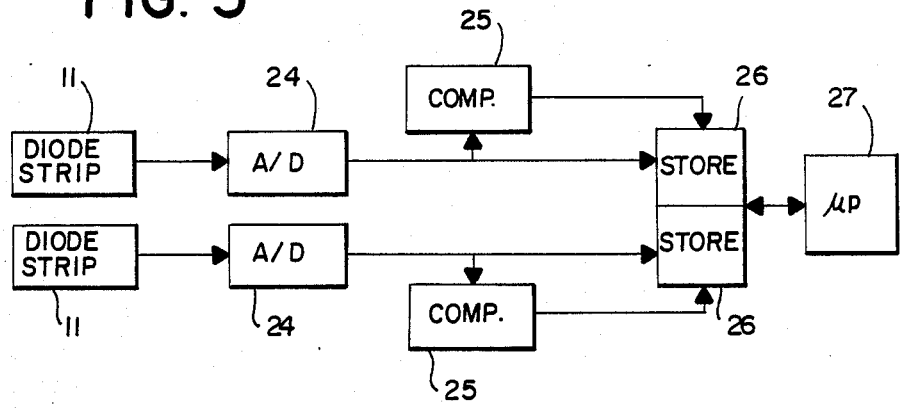

METHOD AND APPARATUS FOR MEASURING THE DIAMETER OF A RUNNING ELONGATE OBJECT SUCH AS AN OPTICAL FIBER

BACKGROUND OF THE INVENTION

The invention relates to a method and to apparatus for measuring the diameter of a running elongate object such as an optical fiber, for example.

The diameter of an optical fiber needs to be monitored accurately during the manufacturing process, and the diameter must be measured while the fiber is running and without making contact therewith.

French Pat. No. 2,483,070 describes measuring the width or the diameter of a running object being manufactured, such as a strip, a rod, or a tube. The measurement is performed by means of two video cameras having optical axes which are substantially coplanar, mutually perpendicular, and oriented in such a manner as to intersect the running axis of the object perpendicularly. Each video camera is associated with two rows of photodetectors disposed symmetrically on either side of the optical axis of the camera and with means for scanning each of these rows of photodetectors from the end of the row furthest from the optical axis towards the end adjacent to the optical axis, thereby making it possible to determine the position on each row of the image of an edge of the object and thus to determine the apparent diameter and position of the object.

While it is running, the position of the object relative to its theoretical running axis may vary, due to vibration. The above-mentioned prior patent provides for using one of the video cameras to measure the displacement of the object along the optical axis of the other video camera, and to use this displacement measurement to calculate the appropriate correction for the measurement of the apparent diameter as performed by said other video camera.

However, such apparatus cannot measure with sufficient accuracy the diameter of a very fine object such as an optical fiber whose displacement relative to its theoretical running axis may be of the same order of magnitude as its diameter. The search for sufficient accuracy makes it necessary for each measuring channel to use a single row and single image-magnifying optics of reduced depth of focus, such that displacement of the optical fiber relative to its theoretical running axis gives rise to the formation of a blurred image on the rows of photodetectors, thereby preventing the diameter of the optical fiber and its position relative to its theoretical running axis from being determined. The aim of the invention is to solve this problem in a simple and effective manner capable of providing very much greater measuring accuracy than can be obtained by the means described in the above-mentioned prior patent.

SUMMARY OF THE INVENTION

To this end, the invention provides a method of measuring the diameter of a running elongate object such as an optical fiber by means of two fixed measuring opto-electronic systems having optical axes which are substantially coplanar and perpendicular to one another and which intersect the theoretical running axis of the object perpendicularly. The method consisting of the systems to measure the sideways displacement of the object relative to its theoretical running axis in a direction parallel to the optical axis of the other system, and using the measurement to correct the diameter measurement performed by the other system. The method being characterized in that it consists in using magnifying optics such as microscope optics in each system in order to form a magnified outof-focus image of the object on a strip of individual photodetectors. By identifying which individual photodetectors have an out-of-focus image of one of the edges of the object formed thereon, and recording the signals from said photodetectors the exact position of each edge of the object can be determined by an interpolation computation. This is accomplished by deducing firstly the apparent diameter of the object as measured by a first system and secondly the sideways displacement of the object along the optical axis of the other system.

The method in accordance with the invention thus has the merit of taking advantage of the lack of focus in the enlarged image formed on a strip of photodetectors in order to determine the exact position of each edge of the image of the object with greater accuracy than can be obtained by using a sharp image of the object on the strip of photodetectors.

Thus, compared with the prior art the invention has two advantages: it makes it possible to accurately measure the diameter of a running object which is very fine; and it makes it possible to increase the accuracy of this measurement by a factor of ten, for example.

According to another characteristic of the invention, the magnifying optics of each system is focused outside the zone in which the object moves sideways so as to ensure that the image of the object formed on the strips of photodetectors is always out of focus regardless of the position of the object relative to its theoretical running axis.

High measurement accuracy is thus certain to be obtained regardless of the position of the axis of the object, and even if said axis coincides with the theoretical running axis.

According to another characteristic of the invention, the measurements are performed synchronously by both optoelectronic systems.

This eliminates the effects of movement of the object during measurement.

According to yet another characteristic of the invention, the method consists in identifying the address of the central individual photodetector situated halfway along the image of each edge of the object by comparison with a predetermined threshold, and in performing the above interpolation on the signals from a predetermined number of individual photodetectors situated on either side of said central photodetector.

Under such conditions, the interpolation performed is linear, thereby greatly simplifying the computation.

Further, the number of photo-detectors concerned by the interpolation may be relatively high and determines the factor by which measurement accuracy is improved.

The invention also provides apparatus for measuring the diameter of a running elongate object such as an optical fiber, the apparatus comprising two fixed measuring opto-electronic systems whose optical axes are substantially coplanar and perpendicular to each other and intersect the theoretical running axis of the object perpendicularly, the apparatus being characterized in that each system comprises a magnifying lens such as a microscope lens, forming an out-of-focus image of an object on a strip of individual photodetectors, means for identifying those of the individual photodetectors on which an out-of-focus image of an edge of the object is formed, for computing the exact position of said edge by interpolation, for computing the apparent diameter of the object, and for determining its position along the optical axis of the other system.

According to another characteristic of the invention, each measuring system comprises a comparator connected to the output from the strip of photodetectors in order to determine, for each edge of the object, the address of a central individual photodetector situated halfway along the out-of-focus image of said edge of the object, with the computing means performing the above interpolation only on the output signals from a predetermined number of the photodetectors situated on either side of the central photodetector.

The processing time is thus very considerably reduced.

BRIEF DESCRIPTION OF THE DRAWINGS

The invention will be better understood, and other characteristics, details, and advantages thereof will appear, from the following explanatory description given with reference to the accompanying drawings, in which:

FIG. 2 is a diagram showing how the edges of the image of an optical fiber are detected when the image formed on the strip of photo-detectors is in focus;

FIG. 3 is a diagram showing how the position of an edge in an out-of-focus image formed on the strip of photo-detectors is detected;

FIG. 4 is a diagram showing how the microscope optics are focused relative to the displacement zone of the optical fiber axis; and FIG. 5 is a block diagram of the means for processing the signals provided by the strips of photodetectors.

DESCRIPTION OF THE DRAWINGS

Figure 1:
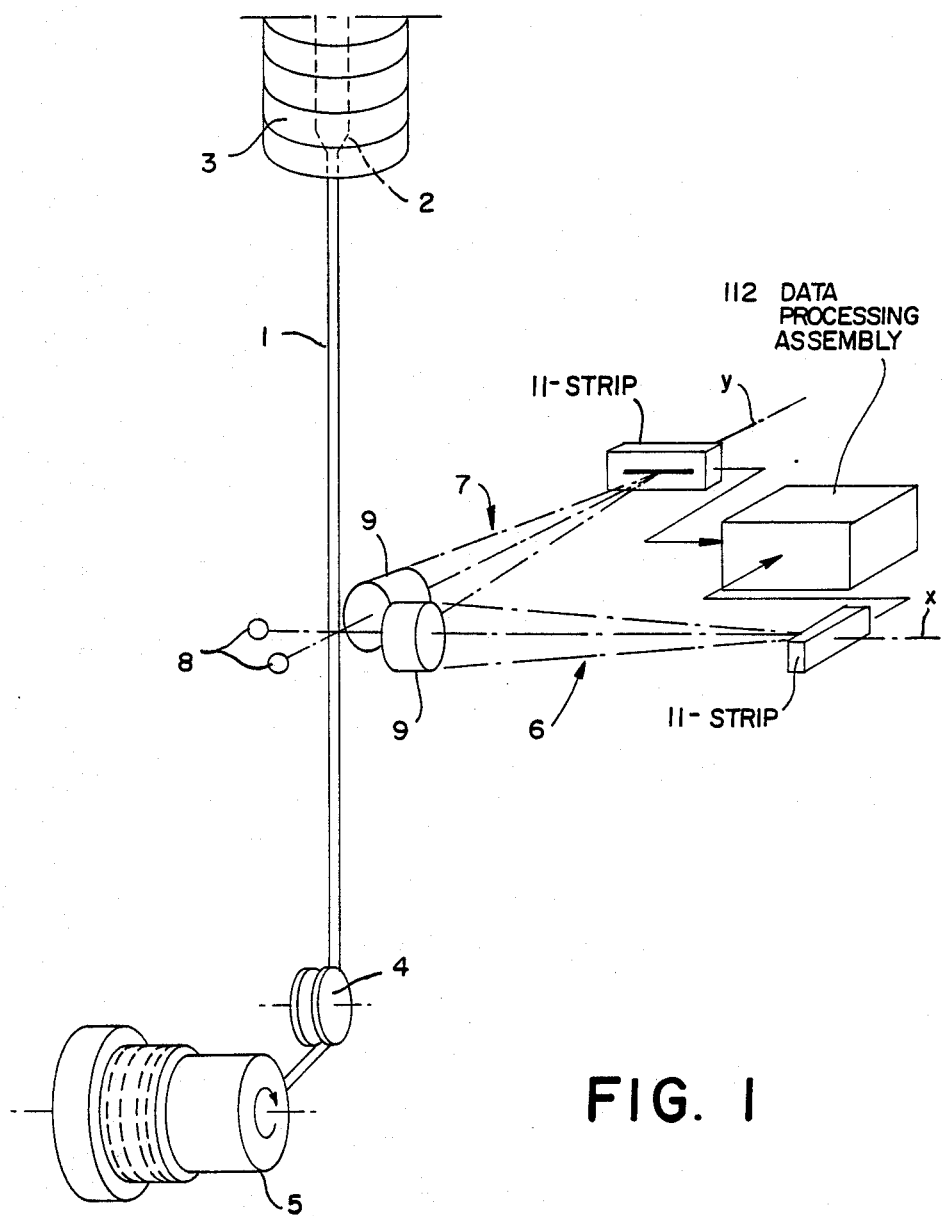
FIG. 1 is a diagram of optical fiber diameter measuring apparatus in accordance with the invention.

Reference is made initially to FIG. 1, which is a diagram of the apparatus in accordance with the invention for measuring the diameter of an optical fiber during the fiber-manufacturing process.

The optical fiber 1 emerges from a blank 2 which is heated in an oven provided with a coil 3. The fiber 1 then passes over a wheel 4 or through a fixed groove prior to being wound on a capstan 5 which is caused to rotate. The displacement axis of the optical fiber is vertical, for example. This optical fiber manufacturing installation does not form part of the invention and is therefore not described in greater detail.

The diameter measuring apparatus in accordance with the invention comprises two fixed opto-electronic systems or assemblies 6 and 7 whose optical axes x and y are substantially coplanar and perpendicular, and are oriented perpendicularly to the displacement axis of the optical fiber.

Each of the systems 6 and 7 includes a light emitting diode (LED) 8 which illuminates the fiber, together with a magnifying lens 9 such as the objective lens of a microscope disposed on the other side of the fiber and forming a magnified image of the fiber on a strip 11 of individual photodetectors, which may be of the charge coupled diode (CCD) type, for example. The two strips 11 are connected to a data processing assembly referenced 112 and serving to calculate the diameter of the optical fiber from the measurements performed. When the microscope lenses 9 are focused on the theoretical displacement axis of the optical fiber, and if the axis of the optical fiber happens to coincide with its theoretical displacement axis, then the images formed by the lenses 9 on the corresponding strips 11 are in focus. FIG. 2 shows how the position of each edge of the image of the fiber is then detected.

In this figure, curve 12 represents the level of illumination at each of the individual photodetectors or pixels 13 of a strip 11. This curve 12 is a square-wave-shaped curve and includes a portion 14 corresponding to the transverse dimension of the image of the optical fiber, two vertical portions 15 corresponding to the edges of said image, and two horizontal portions 16 at a level which is different from the level of the midportion 14, and which corresponds to the image beyond the optical fiber. It will be understood, that under such conditions, each of the edges of the image of the optical fiber can occupy only one pixel, thereby determining measurement accuracy. Since the position of each edge of the optical fiber is determined to within plus or minus one-half of a pixel, the apparent diameter of the optical fiber is determined to within plus or minus one pixel.

However, since the position of the optical fiber axis varies considerably relative to its theoretical displacement axis, this variation is in practice greater than the depth of focus of each of the microscope lenses, such that the images formed on the strips of photodetectors are out of focus.

The invention takes advantage of this lack of focus in order to improve measurement accuracy.

In accordance with the invention, the point of focus 17 of each lens 9 is located between the lens 9 and the zone 18 in which the optical fiber 1 is likely to move sideways as it runs longitudinally, such that the image of the fiber formed by each of the lenses 9 on the corresponding strip 11 is always out of focus.

Under these conditions, the curve 20 showing the level of illumination of the pixels 13 in a strip 11 appears as shown in FIG. 3 and includes a sloping portion 21 interconnecting two substantially flat portions 22 and 23 corresponding respectively to the inside and to the outside of the image of the optical fiber.

The sloping portion 21 which corresponds to the out-of-focus enlarged image of one of the edges of the optical fiber extends over a relatively large number of pixels 13. This portion 21 of the curve is linear, at least away from its ends where it meets the horizontal portions 22 and 23. Thus by taking account of the signals from the pixels 13 concerned, it is possible to determine the exact position of the image of the edge of the optical fiber by linear interpolation with an accuracy which is plus or minus 1/n pixels, where n is the number of pixels concerned, for example 20, thereby increasing measurement accuracy by a factor of 10.

In practice, this interpolation is performed in the manner described with reference to FIG. 5. Each strip 11 of charge coupled diodes is associated, in conventional manner, with shift registers which store the output signals from the pixels in the strip 11. Means for reading these registers sequentially provide a video signal which is applied to the input of an analog-to-digital converter 24 whose output is connected firstly to a comparator 25 and secondly to a data storage memory 26. A microprocessor 27 is connected to the memories 26 in order to perform the necessary computations.

Each comparator stores a threshold value which is predetermined in a setting up process and which serves to identify the address of the pixel whose output signal is closest to that corresponding to the theoretical position of the image of an edge of the optical fiber. The comparator 25 thus serves to determine the addresses of those two pixels which are theoretically closest to the two edges of the image of the optical fiber. The microprocessor 27 then performs linear interpolation solely on output signals coming from the n pixels situated on either side of each central pixel as located by the comparator 25. When n is equal to 20, and each strip of photodetectors includes about 2000 pixels, i.e. has about 1000 pixels which may be concerned by any one of the edges of the fiber, the time required for determining the position of the optical fiber is divided by 50. The accuracy with which the diameter of the optical fiber is measured is then plus or minus 0.1 $\mu$m for an amplitude of sideways displacement of the optical fiber of plus or minus 1 millimeter about its theoretical displacement axis, with the diameter of an optical fiber generally lying in the range about 50 $\mu$m to about 500 $\mu$m.

When the apparent diameter of the optical fiber and its position have been determined, tables or correction functions stored in memory are used for correcting the apparent diameter measurements provided by each system. These tables or correction functions are not common to both systems but are specific to each system in order to take account of the optical characteristics of each of the systems and of manufacturing dispersions. Both systems take measurements synchronously, thereby avoiding sideways displacements and vibrations of the optical fiber from having any effect, with such sideways displacements being capable of reaching about 100 $\mu$m to about 200 $\mu$m at relatively high frequencies.

We claim:

1. A method for measuring a diameter of an optical fiber running along a theoretical axis of displacement, said method comprising the steps of:
   positioning two fixed measuring systems having optical axes which are substantially coplanar, perpendicular and intersect the theoretical axis perpendicularly and each of said systems having a magnifying optics associated with a strip of photodetectors;
   forming a magnified blurred image of the optical fiber on each strip of photodetectors;
   performing an interpolation calculation on the signals from said photodetectors for identifying the exact positions of the optical fiber edges on the blurred image;
   deducing from said positions the apparent diameter of the optical fiber as measured by one of the systems;
   correcting the diameter measurement by using the sideways displacement of the fiber along the axis of said one system as measured by the other system;
   comparing a predetermined threshold with the signals from said photodetectors;
   identifying an address of a particular photodetector situated substantially halfway along the blurred image of the optical fiber; and
   performing a linear interpolation on the signals from a predetermined number of photodetectors situated on either side of said particular photodetector.

2. A method according to claim 1, further comprising the step of focusing the magnifying optics of each system outside a zone in which the object moves sideways so as to ensure that the image of the object formed on the strips of the photodetectors is always out of focus regardless of the position of the object relative to its theoretical running axis.

3. A method according to claim 1, further comprising the step of associating each system with its own table or function for correcting the measurement of the apparent diameter, thereby taking account of its optical characteristics and of manufacturing dispersions.

4. A method according to claim 1, wherein both systems perform measurements synchronously.

5. An apparatus for measuring the diameter of an optical fiber running along a theoretical axis of displacement, the apparatus comprising:
   two fixed measuring opto-electronic systems having optical axes which are coplanar, perpendicular and intersect the theoretical axis of displacement perpendicularly;
   each of said systems including
      a strip of individual photodetectors;
      a magnifying optics for forming a blurred image of said optical fiber on said strip of photodetectors;
      a comparator connected to said photodetectors for comparing the signals from said photodetectors to a predetermined threshold and for determining, for each edge of said optical fiber, an address of a particular photodetector situated halfway along the blurred image of the edge of said optical fiber; and
   computing means for performing a linear interpolation calculation on the output signals from a predetermined number of said photodetectors situated on either side of said particular photodetector.

6. Apparatus according to claim 5, wherein the comparator is a digital comparator connected between an analog-to-digital converter connecting said strip to a memory associated with said computing means.

7. An apparatus according to claim 5, wherein said magnifying optics of each system is focused outside a zone determined by the sideways displacement of said optical fiber.

* * * * *